US007506693B2

(12) United States Patent
Stirm

(10) Patent No.: US 7,506,693 B2
(45) **Date of Patent: *Mar. 24, 2009**

(54) HAMMER

(75) Inventor: Michael Stirm, Oberursel (DE)

(73) Assignee: Black & Decker Inc., Newark, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 11/351,162

(22) Filed: Feb. 9, 2006

(65) Prior Publication Data

US 2007/0039747 A1 Feb. 22, 2007

(30) Foreign Application Priority Data

Feb. 10, 2005 (GB) ................................ 0502708.1
Apr. 29, 2005 (GB) ................................ 0508714.3

(51) Int. Cl.
*B23B 45/16* (2006.01)

(52) U.S. Cl. .......................... 173/48; 173/104; 173/205

(58) Field of Classification Search ................. 173/203, 173/120, 121, 115, 118, 205, 122, 48
See application file for complete search history.

(56) References Cited

U.S. PATENT DOCUMENTS

| | | | | |
|---|---|---|---|---|
| 1,633,995 | A * | 6/1927 | Miller | 173/115 |
| 1,901,981 | A * | 3/1933 | Ousback | 173/115 |
| 1,959,516 | A * | 5/1934 | Baker | 173/115 |
| 2,246,612 | A * | 6/1941 | Ackerman | 74/55 |
| 4,726,430 | A | 2/1988 | Hendrikx et al. | |
| RE33,733 | E | 11/1991 | Hendrikx et al. | |
| 5,337,835 | A | 8/1994 | Bohne et al. | |
| 5,366,025 | A | 11/1994 | Dutschk et al. | |
| 6,199,640 | B1 | 3/2001 | Hecht | |
| 6,520,266 | B2 * | 2/2003 | Bongers-Ambrosius et al. | 173/2 |
| 6,988,563 | B2 * | 1/2006 | Hashimoto et al. | 173/48 |
| 7,059,425 | B2 * | 6/2006 | Ikuta | 173/128 |
| 2007/0000675 | A1 * | 1/2007 | Sell et al. | 173/90 |

FOREIGN PATENT DOCUMENTS

| | | | |
|---|---|---|---|
| CH | 659 422 | A5 | 1/1987 |
| DE | 32 24 050 | A1 | 12/1983 |
| GB | 181 194 | A | 6/1922 |
| GB | 396 140 | A | 8/1933 |
| GB | 469 926 | A | 8/1937 |
| GB | 2295347 | A | 5/1996 |

* cited by examiner

*Primary Examiner*—Rinaldi Rada
*Assistant Examiner*—Lindsay Low
(74) *Attorney, Agent, or Firm*—Scott B. Markow

(57) ABSTRACT

A hammer includes a housing; a motor mounted within the housing; and a tool holder rotatably mounted on the house for holding a cutting tool. A striker is mounted in a freely slideable manner within the housing, for repetitively striking an end of a cutting tool when a cutting tool is held by the tool holder. The striker is reciprocatingly driven by the motor, when the motor is activated, via a drive mechanism. The drive mechanism comprises: a pivoting drive arm pivotally mounted within the housing at one end and which is drivingly connected to the striker; a pivotal drive mechanism connected to the pivoting drive arm and which converts a rotary movement generated by the motor into an oscillating pivotal movement of the pivoting drive arm; and the amplitude of the oscillations of the pivoting drive arm can be adjusted.

8 Claims, 4 Drawing Sheets

HAMMER

FIELD OF THE INVENTION

The present invention relates to powered hammers, to powered rotary hammers, and to power drills having a hammer action.

BACKGROUND OF THE INVENTION

EP 0145070 and DE4121279 forms the closest pieces of prior art and form the basis of the pre-characterising portion of claim 1.

EP0145070 describes a hammer which comprises a ram (or striker) 26 (using the same reference numbers as EP0145070) which is slideably mounted with the main housing of the hammer and which can he reciprocatingly driven via a pivotal arm 32 which is pivotally mounted at one end about a pivot within the housing. The pivotal arm 32 is pivotally driven by the motor via a pivotal drive mechanism which converts the rotary movement of the motor into an oscillating pivotal movement of the arm 32. The ram 26 strikes a tool shaft 1 which in turn imparts the impacts to the end of a cutting tool.

The problem with the design of hammer mechanism disclosed in EP0145070 is that the amplitude of the oscillations of the pivotal arm 32 cannot be adjusted.

DE4121279 also describes a hammer which comprises a ram 24 (using the same reference numbers as DE4121279) which is slideably mounted within the main housing of the hammer and which can be reciprocatingly driven via a pivotal arm 20 which is pivotally mounted within the housing at one about a pivot 16. The pivotal arm 20 is pivotally driven by the motor via a pivotal drive mechanism which converts the rotary movement generated by the motor into an oscillating pivotal movement of the arm 20. The ram 24 strikes a beat piece 28 which in turn strikes the end of a cutting tool 25.

As with EP0145070, the problem with the design of hammer mechanism disclosed in DE4121279 is that the amplitude of oscillation of the arm 20 cannot be adjusted. Another problem associated with the design is that the method by which the end 21 of the pivotal arm 20 is connected to the ram 24. As can be seen on FIGS. 1 and 3 of DE4121279, the end 21 of the arm 20 surrounds the ram 24. Two ribs 22, 23 are formed on the ram 24 between which the end 21 of the arm 20 can freely slide. Thus the ram 24 can slide within the arm 20, the amount of movement being limited by the ribs 22, 23 ie the arm 20 is non fixedly connected to the ram. This results in a limited range of free movement of the ram 24 relative to the pivoting arm 20. As such the control of the ram 24 during the hammering operation is diminished.

GB2295347 and U.S. Pat. No. 5,337,835 are also relevant pieces of prior art.

BRIEF SUMMARY OF THE INVENTION

Accordingly there is provided a hammer comprising:

a housing;

a motor mounted within the housing;

a tool holder rotatably mounted on the housing for holding a cutting tool;

a striker mounted in a freely slideable manner within the housing, for repetitively striking an end of a cutting tool when a cutting tool is held by the tool holder, which striker is reciprocatingly driven by the motor, when the motor is activated, via a drive mechanism;

wherein the drive mechanism comprises:

a pivoting drive arm pivotally mounted within the housing at one end and which is drivingly connected to the striker;

a pivotal drive mechanism connected to the pivoting drive arm which converts a rotary movement generated by the motor to an oscillating pivotal movement of the pivoting drive arm about its pivot point;

characterised in that the size of the amplitude of the oscillations of the pivoting drive arm can be adjusted.

Such a construction can be utilised both in rotary hammers which can perform a drilling function, chiselling function or a combination of the two, and in hammers which can perform a chiselling function only.

BRIEF DESCRIPTION OF THE DRAWINGS

Three embodiments of the present invention will now be described with reference to the accompanying drawings of which.

DETAILED DESCRIPTION OF THE INVENTION

A hammer drill comprises a housing 2 in which is mounted a motor (not shown). A handle 4 is attached to the rear of the housing which can be activated using a trigger switch 6. A tool holder is mounted on the front of the housing 2. The tool holder 8 holds a cutting tool (not shown) such as a drill bit. The motor reciprocatingly drives a ram which in repetitively impacts the end of a cutting tool, via a beat piece, when located within the tool holder in well known manner.

The present invention concerns the mechanism by which the rotary drive generated by the motor is converted into a reciprocating movement of the ram within a hammer. Four embodiments of the present invention will now be described.

Figure 1:
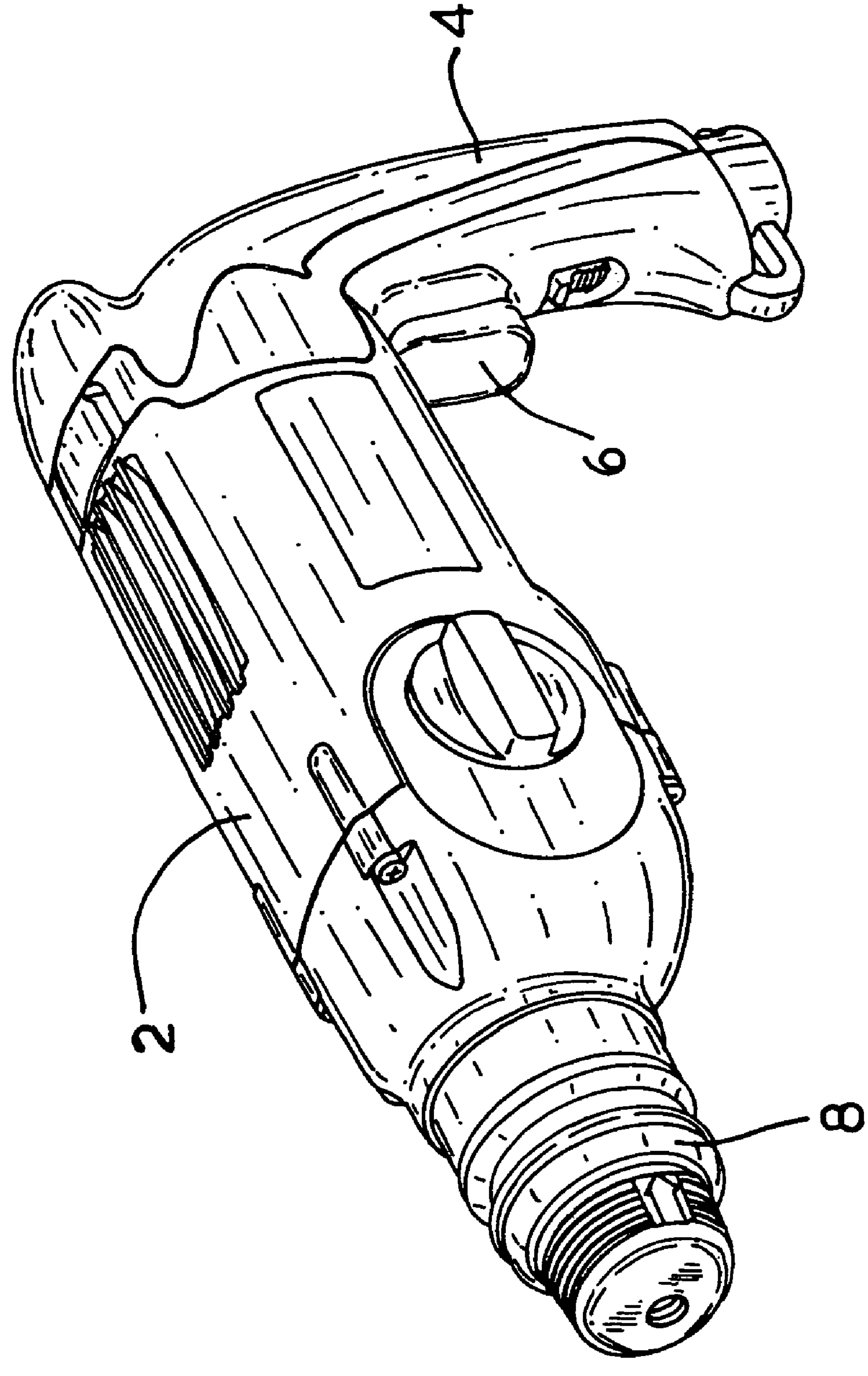
FIG. 1 shows a perspective view of a percussion drill.
Figures 2, 2A:
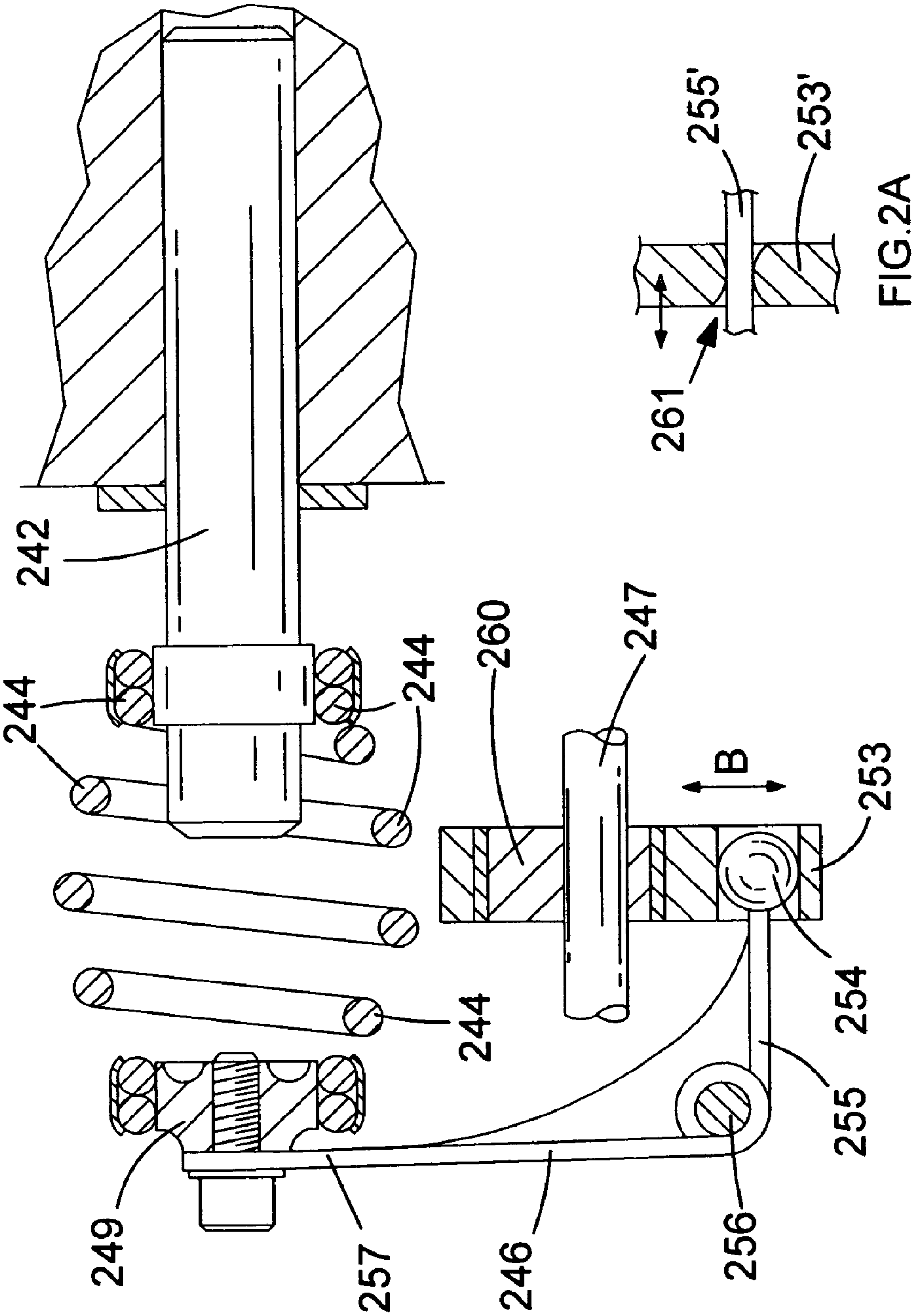
FIGS. 2 and 2A are views of a hammer mechanism of a first embodiment of the present invention.

FIG. 2 shows a hammer mechanism of a first embodiment of the invention. A shaft 247 is rotatable by means of a motor (not shown) and rigidly carries an eccentrically mounted circular disk 260. The central axis of the disk 260 is parallel to but not co-axial with the longitudinal axis of the shaft 247. As the shaft 247 rotates, the axis of the disk rotates about the axis of the longitudinal axis of the shaft 247.

A yolk 253 surrounds the disk 260 which converts the rotational movement of the disk 260 into a vertical oscillating movement in the direction of Arrow B. The lower section of the yolk 253 comprises a recess which receives a ball 254 slidably mounted on a first arm 255 of a torsion spring 246 pivotally mounted about a support 256. As a result, rotation of the shaft 247 by means of the motor causes the end of the first arm 255 of torsion spring 246 to oscillate in a vertical direction as shown in FIG. 2, which in turn causes horizontal oscillation of a support 249 mounted to the end of a second arm 257 of the torsion spring 246. This oscillating motion of the support 249 is transferred via a h heal spring 244 of convex axial cross section to a ram (or striker) 242 to impart impacts to a beat piece (not shown) which in turn strikes the end of drill bit held by the tool holder 8. The convex axial cross section results in the spring 244 having an envelope convexly shaped along its length ie the diameter of the spring 244 at its centre is greater than either at its ends. The amplitude of oscillation of the end of the first arm 255 of torsion spring 246

(and therefore of the support 249 at the end of the second arm 257 of torsion spring 246) is adjusted by axially displacing the yolk 253, together with the ball 254, along the shift 247. The hammer mechanism will be constructed such that the disk 260 remains, at least partially, within the yolk in all positions.

Alternatively, the ball 254 could be absent and the end of the first arm 255' slidably fit within a narrower aperture 261 in the yolk 253', as shown in FIG. 2A. The inner walls of the aperture 261 can be convex to accommodate the pivotal movement of the first arm 255'. This has the added benefit of only having to axially displace the yolk 253 in order to adjust the amplitude of oscillation of the end of the first arm 255.

Figure 3:
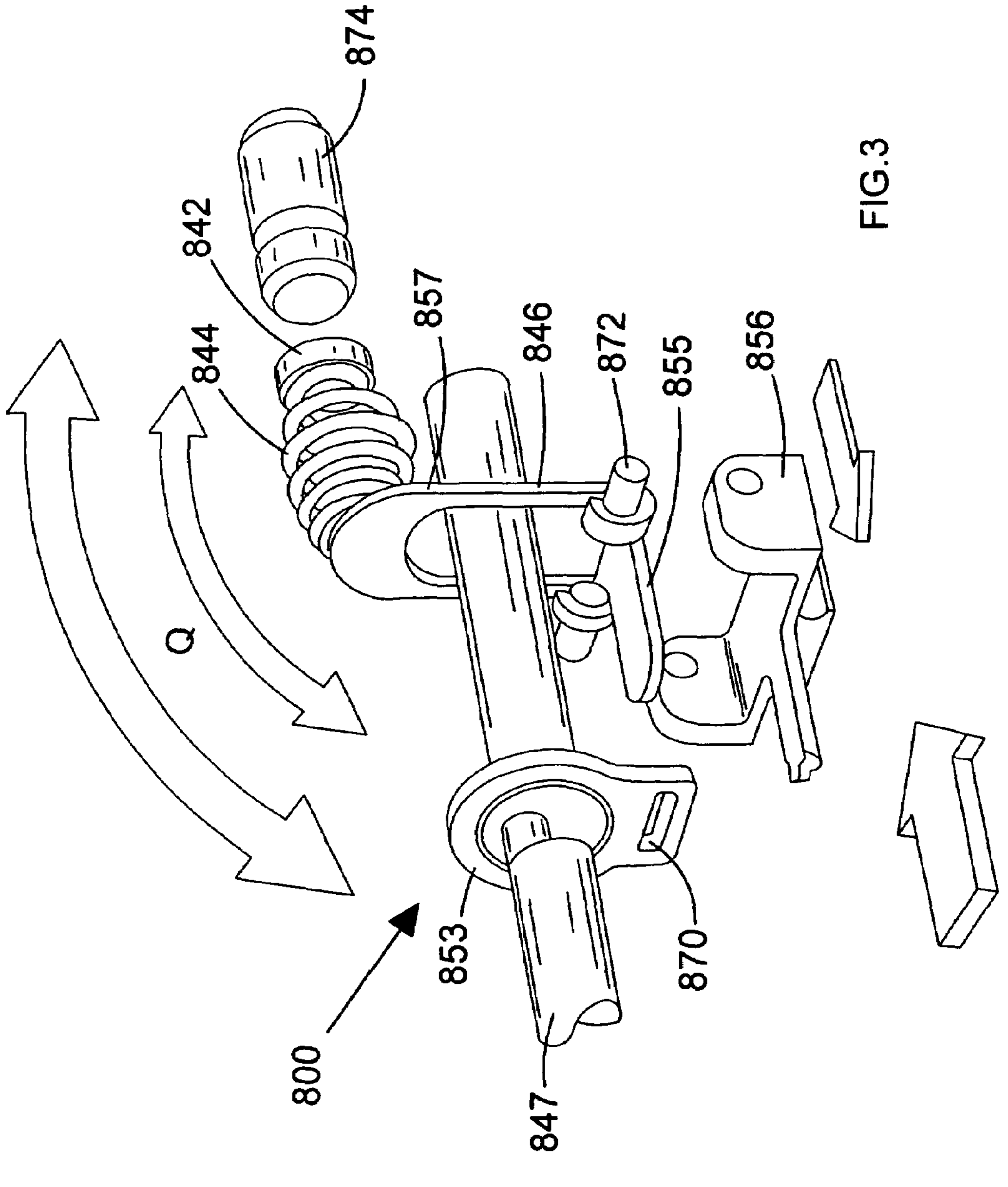
FIG. 3 is an exploded view of the second embodiment of the present invention.

A hammer mechanism 800 of a second embodiment is shown in FIG. 3. FIG. 3 shows an exploded view of the mechanism. An eccentric bearing 853 is mounted to a shaft 847 which is rotated by means of a motor (not shown). Rotation of the shaft 847 results in a vertical oscillation of the eccentric hearing 853. The eccentric bearing 853 has a slot 870 for slidably receiving a first arm 855 of an angled lever arm 846 pivotably mounted via pivot 872 to a support bearing 856. Rotation of the shaft 847 causes vertical oscillation of the slot 870 in the eccentric bearing 853, and therefore of the first arm 855 of the angled lever arm 846, as a result of which axial oscillation in the direction of Arrow Q of a second arm 857 of the lever arm 846 occurs. This oscillation is transferred via a spring 844 to a connector 842 which is attached to a ram (or striker) 874. The rain 874 imparts impacts to a tool bit (not shown).

The lever arm bearing 856 can slideably move forward and backwards (right and left in FIG. 3) causing the first arm 855 to slide further into or out of the slot 870 which remains stationary in the horizontal direction. The lever arm bearing 856 is biased forwards (right) as shown in FIG. 3 relative to the shaft 847. The lever arm bearing is connected to the tool holder (not shown) so that when pressure is applied onto the tool holder, the lever arm bearing 856 moves backwards (left) against the biasing force. Therefore, by pressing the tool bit harder held by the tool holder into a work piece (not shown) the first arm 855 of the lever arm 846 slides further into the slot 870 to cause enlarged oscillation of the second arm 857 of the angled lever arm 846. In this way, pressing the tool bit harder into the work piece increases the amplitude of impact of the hammer mechanism 800.

Figure 4:
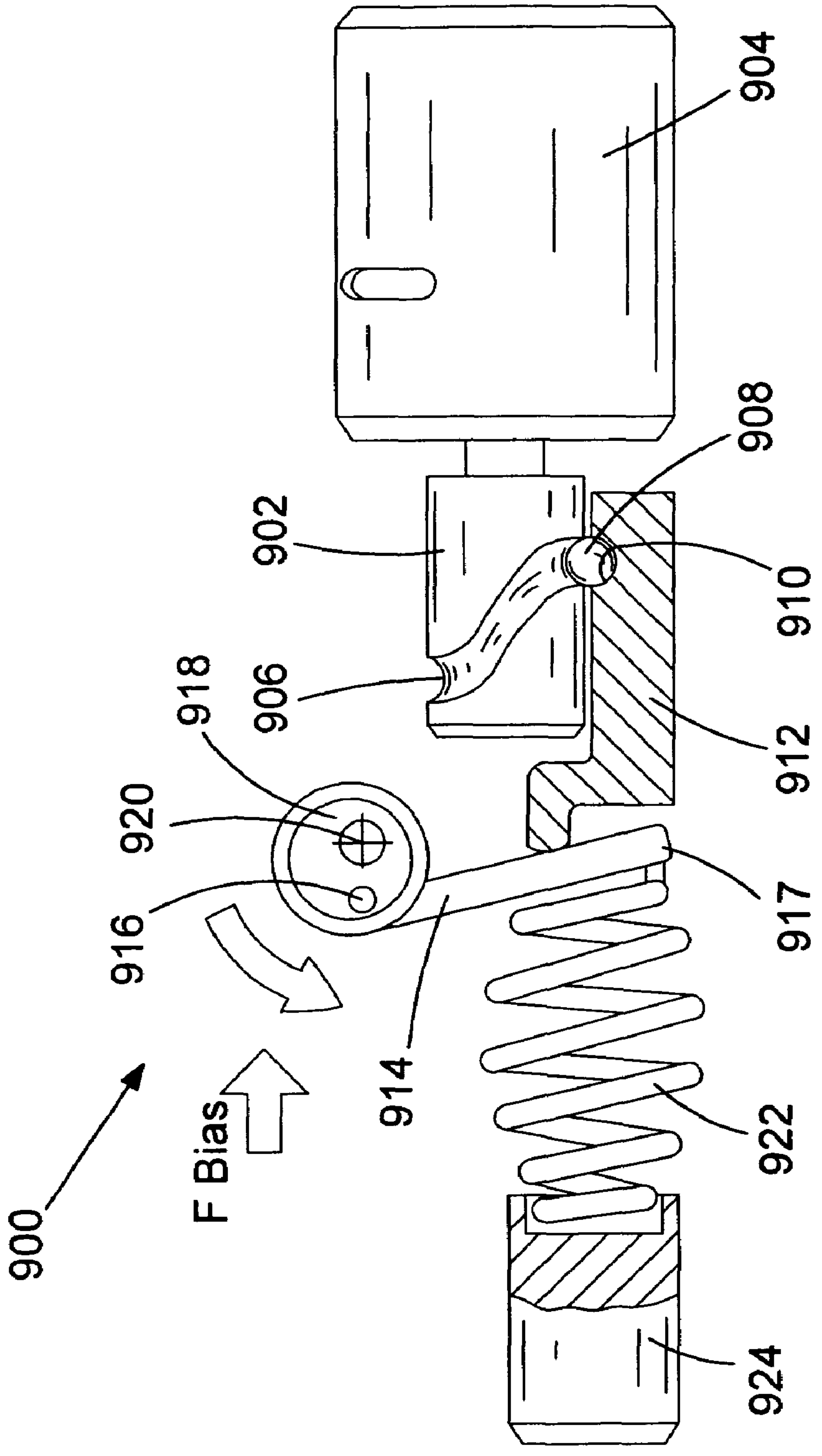
FIG. 4 is an exploded view of the third embodiment of the present invention.

Referring to FIG. 4, a hammer mechanism 900 of a third embodiment of the invention comprises an output gear 902 driven by means of a motor and gear box 904. The output gear 902 has a continuous sinusoidal groove 906 which receives a ball bearing 908 received within a recess 910 in a drive member 912. The drive member can freely slide horizontally backwards and forwards (right and left in FIG. 4) but is prevented from any other type of movement. As such, one complete rotation of the output gear 902 causes one complete axial horizontal oscillation of the drive member 912. The drive member 912 abuts against the side of an arm 914, which is pivotable about a pivot 916 on an eccentric gear 918 mounted about an axis 920. By rotation of the gear 918 about the axis 920, the position at which the drive member 912 engages the arm 914 relative to the pivot 916 can V adjusted, which in turn adjusts the amplitude of oscillation of the distal end 917 of the arm 914. A spring 922 connected to the distal end 917 of the arm 914 transfers the reciprocating movement of the drive member 912 to a ram (or striker) 924 located in a hollow spindle (not shown) to impart impacts to the tool bit.

The invention claimed is:

1. A hammer comprising:

a housing;

a motor mounted within the housing;

a tool holder mounted on the housing for holding a cutting tool;

a ram mounted for axial movement within the housing;

a spring mounted coaxially with the ram;

a barrel cam for converting rotary input from the motor into an axial drive output;

a drive member driven by the barrel cam to reciprocate in the axial direction;

a drive arm pivotably mounted on a pivot point at a first location and contacting the spring at a second location and acted on by the drive member at a third location;

a wheel mounted on an axis for rotation, and the pivot point of the drive arm is located on the wheel at a point radially outward from the axis, so that rotation of the wheel moves the pivot point in order to adjust the third location on the drive arm; and wherein the drive arm acts between the drive member and the spring to transfer the axial reciprocation of the drive member to the ram via the spring and the third location on the drive arm is adjustable, so as to vary the amount of axial movement transferred from the drive member to the spring.

2. A hammer as claimed in claim 1 wherein the wheel is eccentrically mounted on the axis for rotation.

3. A hammer as claimed in claim 1 wherein the third location on the drive arm is between the first location and the second location.

4. A hammer as claimed in claim 1 and wherein the spring is a helical spring.

5. A hammer as claimed in claim 4 and wherein the helical spring is barrel shaped.

6. A hammer as claimed in claim 1 wherein the barrel cam includes a channel.

7. A hammer as claimed in claim 6 wherein the channel is an inclined groove.

8. A hammer as claimed in claim 1 and further including a ball bearing operatively connecting the drive member and the barrel cam.

* * * * *